(12) United States Patent
Miyazaki

(10) Patent No.: US 11,364,744 B2
(45) Date of Patent: Jun. 21, 2022

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 195 days.

(21) Appl. No.: 16/591,953

(22) Filed: Oct. 3, 2019

(65) Prior Publication Data

US 2020/0122513 A1 Apr. 23, 2020

(30) Foreign Application Priority Data

Oct. 22, 2018 (JP) .............................. JP2018-198695

(51) Int. Cl.
| | | |
|---|---|---|
| *B60C 11/12* | (2006.01) | |
| *B60C 11/13* | (2006.01) | |
| *B60C 11/03* | (2006.01) | |

(52) U.S. Cl.
CPC ........ *B60C 11/0304* (2013.01); *B60C 11/125* (2013.01); *B60C 11/1259* (2013.01);
(Continued)

(58) Field of Classification Search
CPC ............... B60C 11/125; B60C 11/1281; B60C 11/1353; B60C 11/1376;
(Continued)

(56) References Cited

U.S. PATENT DOCUMENTS

| | | | | |
|---|---|---|---|---|
| 2012/0318420 A1* | 12/2012 | Sawai | ................... | B60C 11/042 |
| | | | | 152/209.15 |
| 2013/0068360 A1* | 3/2013 | Tamugi | .................. | B60C 11/12 |
| | | | | 152/209.18 |

(Continued)

FOREIGN PATENT DOCUMENTS

| | | | | |
|---|---|---|---|---|
| DE | 102012108847 A1 * | 3/2014 | ......... | B60C 11/0309 |
| JP | 2015-134580 | * | 7/2015 | |

(Continued)

OTHER PUBLICATIONS

English machine translation of JP2015-134580. (Year: 2015).*

(Continued)

*Primary Examiner* — Robert C Dye
(74) *Attorney, Agent, or Firm* — Westerman, Hattori, Daniels & Adrian, LLP

(57) ABSTRACT

A tire has a lug, a plurality of first recessed regions that extend from a first major groove, and a plurality of second recessed regions that extend from a second major groove. A central region of the lug protrudes relative to either end of the lug. The plurality of first and second recessed regions are arranged in alternating fashion along a tire circumferential direction. The respective recessed regions each has a planar base that extends in a width direction of the each recessed region. The planar base is horizontal, or is inclined in such fashion that a height thereof increases so as to extend further toward an exterior in a tire radial direction as one proceeds toward a center of the each recessed region. Width of the planar base increases as one proceeds from the center in the width direction of the lug to an end of the lug.

6 Claims, 10 Drawing Sheets

(52) U.S. Cl.
CPC ...... *B60C 11/1281* (2013.01); *B60C 11/1353* (2013.01); *B60C 11/1376* (2013.01); *B60C 2011/0365* (2013.01); *B60C 2011/0369* (2013.01); *B60C 2011/0381* (2013.01); *B60C 2011/1361* (2013.01)

(58) Field of Classification Search
CPC ..... B60C 2011/0365; B60C 2011/0369; B60C 2011/0381; B60C 2011/1361; B60C 11/0304; B60C 11/0309; B60C 2011/0362
See application file for complete search history.

(56) References Cited

U.S. PATENT DOCUMENTS

| | | | | |
|---|---|---|---|---|
| 2013/0153104 | A1* | 6/2013 | Buxton | B60C 11/1353 152/209.18 |
| 2014/0238567 | A1* | 8/2014 | Iwasaki | B60C 11/0306 152/209.18 |
| 2016/0236517 | A1* | 8/2016 | Nagase | B60C 11/0304 |
| 2017/0166014 | A1* | 6/2017 | Takemoto | B60C 11/032 |
| 2017/0297378 | A1* | 10/2017 | Honda | B60C 11/0306 |
| 2018/0170114 | A1 | 6/2018 | Hayashi | |
| 2019/0344622 | A1* | 11/2019 | Shimizu | B60C 11/04 |

FOREIGN PATENT DOCUMENTS

| | | | | |
|---|---|---|---|---|
| JP | 2017-001584 | A | | 1/2017 |
| JP | 2017-65285 | A | | 4/2017 |
| JP | 2018111453 | A | * | 7/2018 ......... B60C 11/1259 |
| JP | 2018-127094 | A | | 8/2018 |

OTHER PUBLICATIONS

Office Action dated Jul. 14, 2021, issued in counterpart CN Application No. 201910856554.4, with English Translation. (15 pages).
Office Action dated Mar. 1, 2022, issued in Counterpart CN Application No. 201910856554.4, with English Translation. (13 pages).

* cited by examiner

A1-A1

A2-A2

A1-A1

A1-A1

# PNEUMATIC TIRE

BACKGROUND OF THE INVENTION

The present disclosure relates to a pneumatic tire.

Japanese Patent Application Publication Kokai No. 2017-65285 describes imparting a lug with a convexly curved shape so as to improve water shedding performance and so as to improve kinematic performance on a dry road surface.

At Japanese Patent Application Publication Kokai No. 2017-65285, imparting the lug with a convexly curved shape causes contact patch pressure to be higher toward the center of the contact patch surface and to gradually decrease as one proceeds toward either end of the contact patch surface. It is described that this will allow adequate contact patch surface area to be attained at the lug, and will make it possible to improve kinematic performance on a dry road surface.

However, if contact patch pressure becomes too high toward the center of the lug, or contact patch pressure becomes too low at the end of the lug, this will disturb the balance in contact patch pressure and impair performance on a dry road surface.

SUMMARY OF THE INVENTION

It is an object of the present disclosure to provide a pneumatic tire that will make it possible to simultaneously achieve improvement in performance with respect to stability in handling on a dry road surface and improvement in water shedding performance.

According of the present disclosure, there is provided a pneumatic tire comprising:

a lug that is partitioned by a first major groove and a second major groove, and that forms a contact patch surface;

a plurality of first recessed regions that extend from the first major groove so as to be directed toward a center in a tire width direction of the lug, that terminate within an interior of the lug, and that are recessed relative to the contact patch surface; and a plurality of second recessed regions that extend from the second major groove so as to be directed toward the center in the tire width direction of the lug, that terminate within the interior of the lug, and that are recessed relative to the contact patch surface;

wherein the lug is such that a central region thereof in the tire width direction protrudes relative to either end thereof in the tire width direction;

wherein the plurality of first recessed regions and the plurality of second recessed regions are arranged in alternating fashion along a tire circumferential direction;

wherein the respective recessed regions each has a vertical face that descends in a vertical direction from the contact patch surface, and a planar base that extends in a width direction of the each recessed region;

wherein the planar base is horizontal, or is inclined in such fashion that a height thereof increases so as to extend further toward an exterior in a tire radial direction as one proceeds toward a center of the each recessed region as viewed in a section taken along the width direction of the each recessed region; and wherein width of the planar base increases as one proceeds from the center in the width direction of the lug to an end of the lug.

In accordance with this constitution, because lug is such that central region in the tire width direction protrudes toward the exterior in the tire radial direction relative to end(s) in the tire width direction, there will be increased tendency for central region in the tire width direction to make contact with the ground as compared with end(s), increasing contact patch pressure at central region in the tire width direction when on a dry road surface, this being in a direction such as will permit increase in uniformity in contact patch pressure, which will make it possible to improve performance with respect to stability in handling. And yet, if the amount by which this protrudes relative thereto is excessive, this will disturb the balance in contact patch pressure. In this regard, because the width of planar base (recessed region) at the end of lug is formed so as to be greater than the width of planar base (recessed region) at a location toward the center of the lug, this will increase contact patch pressure at end(s) in the tire width direction of lug as compared with central region in the tire width direction of lug, making it possible to achieve balance in contact patch pressure between the central portion and the end(s), as a result of which performance with respect to stability in handling when on a dry road surface will be improved.

Furthermore, because planar base is horizontal, or is inclined in such fashion that the height thereof increases so as to extend further toward the exterior in the tire radial direction as one proceeds toward the center of recessed region as viewed in a section taken along the width direction of recessed region, it will be possible to suppress occurrence of a situation in which excessive size of recessed region causes reduced rigidity at lug and impairment of performance with respect to stability in handling when on a dry road surface.

At the same time, because lug is such that central region in the tire width direction protrudes beyond the two ends in the tire width direction, it will be possible improve performance with respect to water shedding.

DETAILED DESCRIPTION OF THE PREFERRED EMBODIMENTS

First Embodiment

Figure 1:
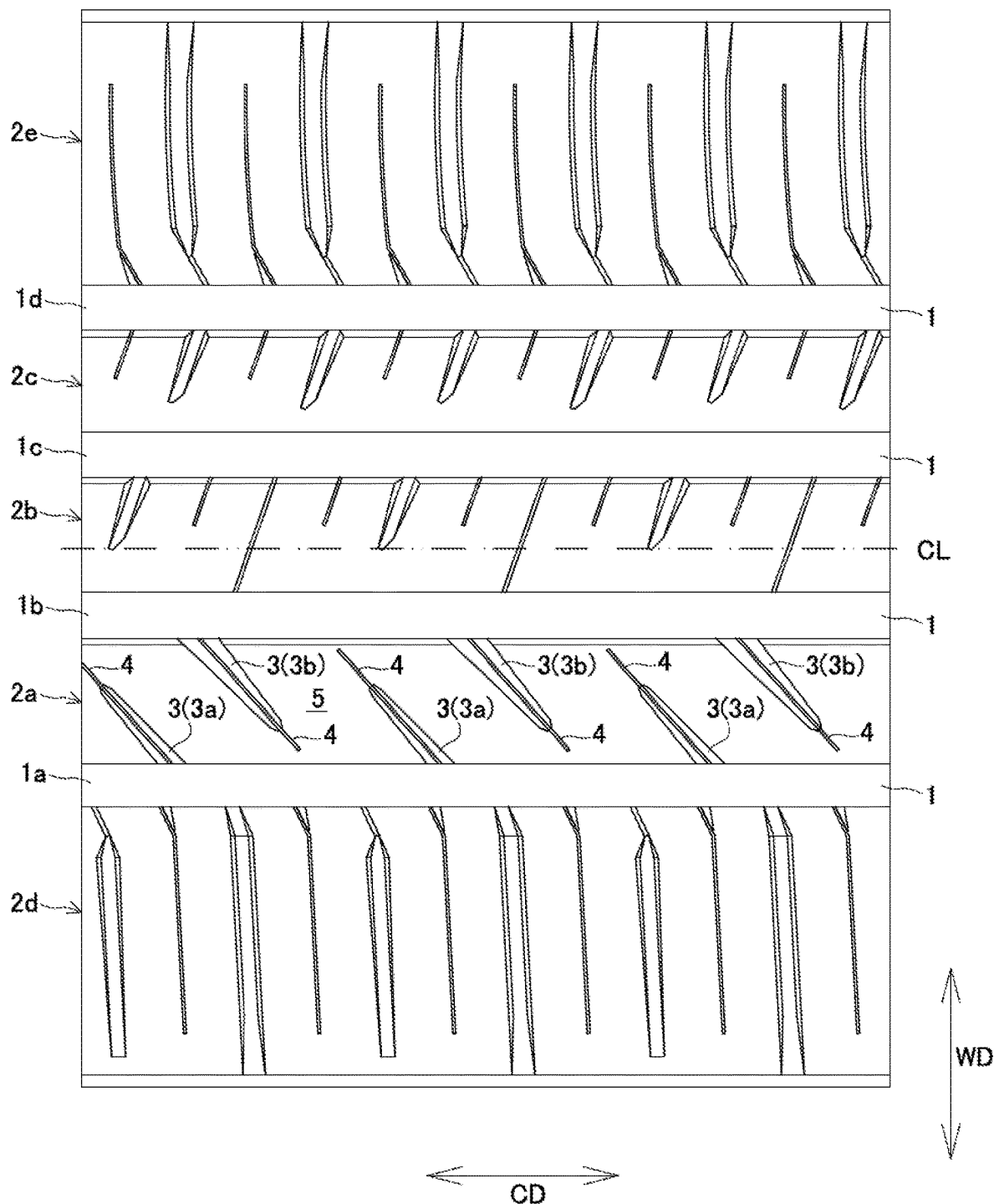
[FIG. 1] Plan view showing tread pattern in accordance with a first embodiment

Below, a first embodiment in accordance with the present disclosure is described. In the drawings, "CD" refers to the tire circumferential direction, and "WD" refers to the tire width direction. The respective drawings show shapes as they would exist when the tire is still new.

While not shown in the drawings, a pneumatic tire in accordance with the first embodiment, in similar fashion as with an ordinary pneumatic tire, is provided with a pair of bead cores; a carcass that wraps around the bead cores in toroidal fashion; a belt layer arranged toward the exterior in the tire radial direction from a crown region of the carcass; and a tread region arranged toward the exterior in the tire radial direction from the belt layer.

As shown in FIG. 1, the tread region has a plurality of major grooves 1 (1a, 1b, 1c, 1d) extending in the tire circumferential direction CD, and lug 2a that is partitioned by two major grooves 1a, 1b and that forms contact patch surface 5. The tread region also has lug 2b that is partitioned by two major grooves (1b, 1c) and that is arranged at the tire equator CL; lug 2c that is partitioned by two major grooves (1c, 1d), and lug 2d [2e] that is partitioned by major groove 1a [1d] which is outwardmost in the tire width direction WD. So long as they extend in the tire circumferential direction, the major grooves may coincide with the tire circumferential direction or may be inclined with respect thereto, and/or may be zigzag-shaped. The number of major grooves that are present may be varied as appropriate. Whereas in the present embodiment there are four major grooves 1 arranged so as to avoid tire equator CL, there is no limitation with respect thereto. For example, the present disclosure may also be understood to apply to the situation in which a lug is partitioned by a first major groove that is arranged on tire equator CL and a second major groove.

Contact patch surface 5 refers to the surface that contacts the road surface when a tire inflated to normal internal pressure mounted on a normal rim and bearing a normal load is disposed in perpendicular fashion above a flat road surface. A normal rim is that particular rim which is specified for use with a particular tire in the context of the body of standards that contains the standard that applies to the tire in question. This is referred to as a "standard rim" in the case of JATMA, as a "design rim" in the case of TRA, and as a "measuring rim" in the case of ETRTO.

Normal internal pressure is that air pressure which is specified for use with a particular tire in the context of the body of standards that contains the standard that applies to the tire in question. This is referred to as "maximum air pressure" in the case of JATMA, the maximum value listed in the table entitled "Tire Load Limits at Various Cold Inflation Pressures" in the case of TRA, and as "inflation pressure" in the case of ETRTO, which when the tire is to used on a passenger vehicle is taken to be an internal pressure of 180 KPa.

Normal load is that load which is specified for use with a particular tire in the context of the body of standards that contains the standard that applies to the tire in question. This is referred to as "maximum load capacity" in the case of JATMA, the maximum value listed in the aforementioned table in the case of TRA, and as "load capacity" in the case of ETRTO, which when the tire is to be used on a passenger vehicle is taken to be 85% of the load corresponding to an internal pressure of 180 KPa.

Figure 2A:
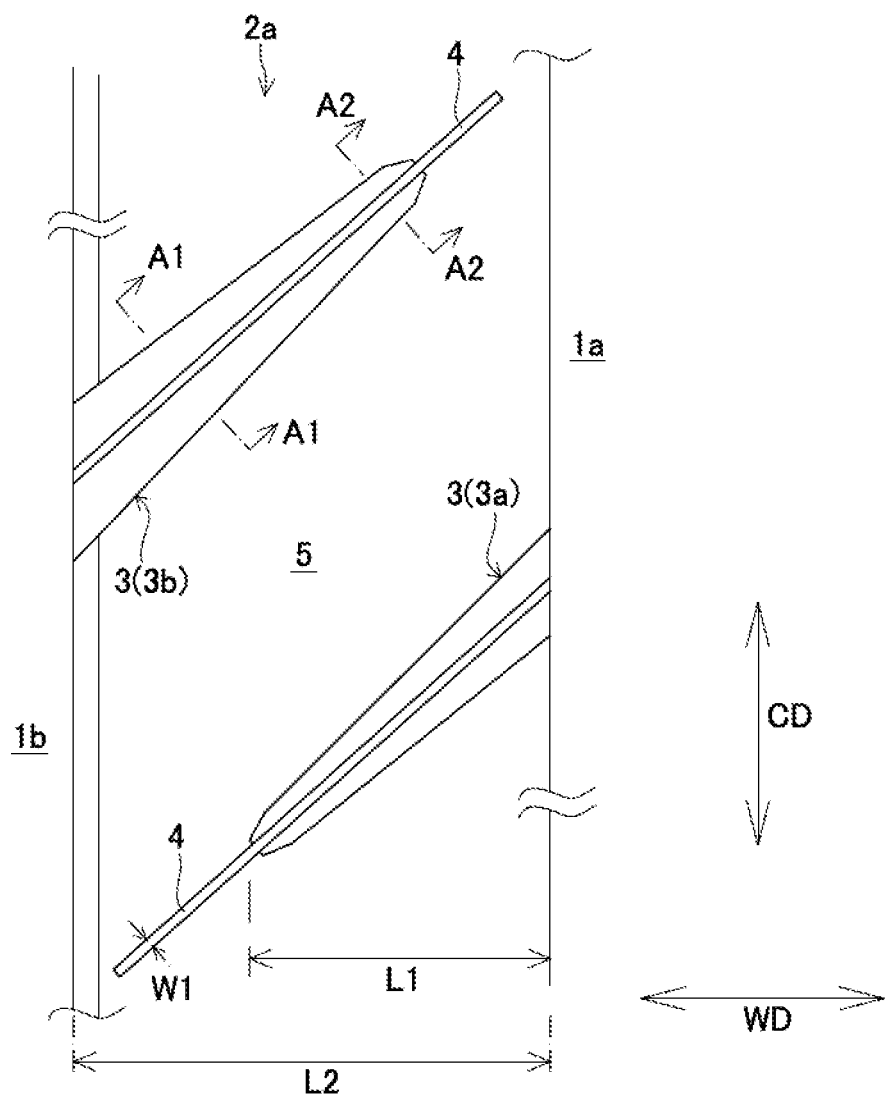
[FIG. 2A] Plan view showing lug in which recessed regions and sipes are formed
Figure 2B:
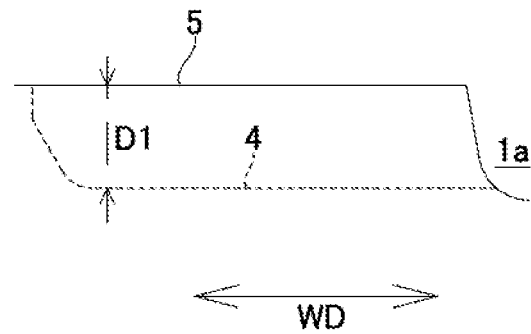
[FIG. 2B] Drawing showing projection in the tire width direction of the shape of sipe at a central portion in the width direction of the sipe

As shown in FIG. 1 and FIG. 2A formed at lug 2a are sipes 4 that extend from one of two major grooves 1a, 1b so as to be directed toward the center in the tire width direction of lug 2a. As shown in 2A, it is preferred that width W1 of sipe 4 be 0.3 mm to 1.2 mm. FIG. 2B is a drawing showing the projection in the tire width direction WD of the shape of sipe 4 at the center in the width direction of sipe 4. As shown in FIG. 2B, it is preferred that depth D1 of sipe 4 be 2 mm to 7 mm.

Figure 3A:
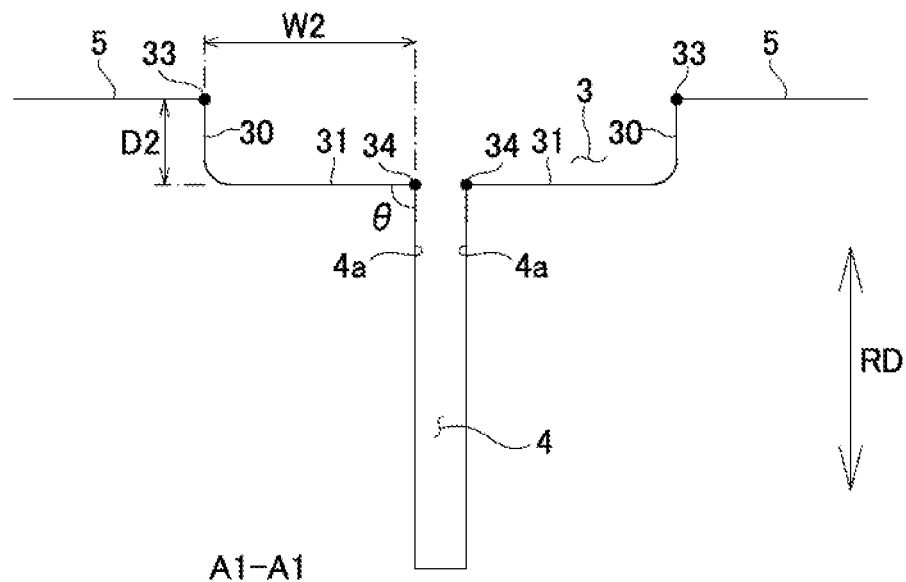
[FIG. 3A] Sectional view taken along section A1-A1 in FIG. 2A
Figure 3B:
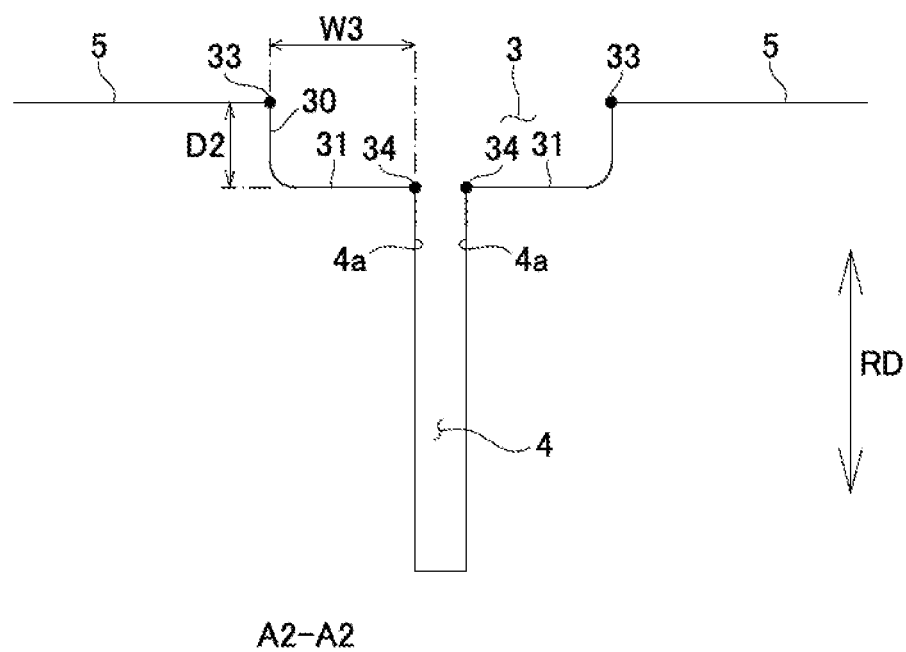
[FIG. 3B] Sectional view taken along section A2-A2 in FIG. 2A

FIG. 3A and FIG. 3B are views taken along sections in the width direction of sipe 4 and recessed region 3. As shown in FIG. 3A and FIG. 3B, opening sidewall 4a which forms the opening of sipe 4 extends in the vertical direction which is parallel to the tire radial direction RD. Note that while not only opening sidewall 4a which forms the opening of sipe 4 but also the entire sidewall extends in the vertical direction in the present embodiment, there is no limitation with respect thereto. So long as opening sidewall 4a which forms the opening of sipe 4 extends in the vertical direction, the shape of the lower portion and or the central portion of the sipe may be varied as appropriate.

As shown in FIG. 1, FIG. 2A, FIG. 3A, and FIG. 3B, formed at lug 2a is recessed region 3 which is recessed relative to contact patch surface 5. Recessed region 3 is formed to either side in the width direction of sipe 4. Recessed region 3 extends from one of two major grooves 1a, 2b so as to be directed toward the center in the tire width direction of lug 2a. While recessed region 3 is inclined with respect to both the tire width direction WD and the tire circumferential direction CD in accordance with the first embodiment, there is no limitation with respect thereto. So long as it extends so as to be inclined with respect to the tire circumferential direction CD, the direction in which recessed region 3 extends may coincide with the tire width direction WD. Recessed region 3 is such that a first end thereof opens into major groove 1, and a second end thereof terminates within the interior of lug 2a. As shown in FIG. 2A, it is preferred that length L1 in the tire width direction of recessed region 3 be 50% to 90% of length L2 in the tire width direction of lug 2a. The reason for this is that this will facilitate attainment of traction due to first edge 33 and second edge 34, as is described below.

A plurality of recessed regions 3 are provided at lug 2a which is partitioned by first major groove 1a and second major groove 1b. The plurality of recessed regions 3 comprise a plurality of first recessed regions 3a extending from first major groove 1a so as to be directed toward the center in the tire width direction of lug 2a and terminating within the interior of lug 2a, and a plurality of second recessed regions 3b extending from second major groove 1b so as to be directed toward the center in the tire width direction of lug 2a and terminating within the interior of lug 2a. As shown in FIG. 1 and FIG. 2A, the plurality of first recessed regions 3a and the plurality of second recessed regions 3b are arranged in alternating fashion along the tire circumferential direction CD.

As shown in FIG. 3A and FIG. 3B, recessed region 3 has first vertical face 30 which descends in a vertical direction (RD) from contact patch surface 5, and planar base 31 which intersects opening sidewall 4a of sipe 4. First vertical face 30 forms first edge 33 between it and contact patch surface 5. Planar base 31 and opening sidewall 4a form second edge 34 at which the angle between planar base 31 and opening sidewall 4a is not greater than 90°. In the example at FIG.

3A and FIG. 3B, because planar base 31 extends in the horizontal direction, the angle between planar base 31 and opening sidewall 4a (angle θ at second edge 34) is 90°. As a result of the fact that planar base 31 extends in the horizontal direction, it is possible to improve contact patch pressure in the vicinity of the edge as compared with the situation that would exist were planar base 31 to be inclined in such fashion as to descend toward the interior in the tire radial direction as one proceeds toward the center of recessed region 3.

As shown in FIG. 3A and FIG. 3B, standoff distances W2, W3 to first edge 33 and second edge 34 in the width direction of sipe 4 (i.e., widths W2, W3 of planar base 31 in the width direction of recessed region 3) increase as one proceeds from the center of lug 2a to the end of lug 2a. The relationship W2>W3 is satisfied. Width of recessed region 3 (width of planar base 31) may vary gradually and/or may vary in stepwise fashion.

As shown in FIG. 2A, FIG. 3A, and FIG. 3B, difference D2 in the height in the vertical direction (RD) of first edge 33 and second edge 34 is greater than or equal to 0.5 mm but is less than or equal to 1.5 mm. Furthermore, distances to first edge 33 and second edge 34 in the width direction of sipe 4 are not less than 1.5 mm. That is, W2≥1.5 mm, and W3≥1.5 mm.

Thus, because difference D2 in the height in the vertical direction of first edge 33 and second edge 34 is not greater than 1.5 mm, and because distances to first edge 33 and second edge 34 in the width direction of sipe 4 are not less than 1.5 mm, it will be possible to achieve a situation in which deformation by lug 2a when acted upon by a load is capable of causing second edge 34 to come in contact with the ground, as a result of which it will be possible to obtain a double edge effect due to action by first edge 33 and second edge 34. For example, where D2>1.5 mm, second edge 34 will tend not to make contact with the around, and it will tend to be impossible to obtain an edge effect due to action by second edge 34. Furthermore, where W2 (W3)≤1.5 mm, as second edge 34 will be too close to first vertical face 30, second edge 34 will tend not to make contact with the ground, and it will tend to be impossible to obtain an edge effect due to action by second edge 34. While it will be possible to obtain an edge effect due to action by first edge 33 if D2≥0.5 mm, it will tend to be impossible to obtain an edge effect due to action by first edge 33 if D2<0.5 mm.

It is preferred that standoff distances W2, W3 to first edge 33 and second edge 34 in the width direction of sipe 4 are not greater than 3.0 mm. W2≤3.0 mm, and W3≤3.0 mm. For example, where W2 (W3)>3.0 mm, recessed region 3 will be large and rigidity of lug 2a will be low, which will impair performance with respect to stability in handling. Of course, where deterioration in performance with respect to stability in handling can be tolerated, it is possible to adopt a constitution in which W2 (W3)>3.0 mm.

On a snowy road surface, there is ordinarily a tendency for the coefficient of friction μ to be low and for contact patch pressure to be low at end 20 in the tire width direction WD of lug 2a, and conversely for contact patch pressure to be high at central region 21 in the tire width direction of lug 2a. In accordance with the present embodiment, because the width of recessed region 3 increases as one proceeds from the center of lug 2a to the end of lug 2a, contact patch area at the end portion of lug 2a will be less than contact patch area toward the center, increasing contact patch pressure per unit area at the end portion of lug 2a and making it possible to achieve increased uniformity in contact patch pressure.

On the other hand, on a dry road surface, the mechanism being different from that which is responsible for the situation on a snowy road surface, there is ordinarily a tendency for contact patch pressure to be high at end 20 in the tire width direction WD of lug 2a due to the high coefficient of friction μ and the increased tendency to make contact with the ground thereat, and conversely there is a tendency for central region 21 in the tire width direction of lug 2a not to make contact with the ground and for contact patch pressure to be low thereat, which produces nonuniformity in contact patch pressure.

Figure 4A:
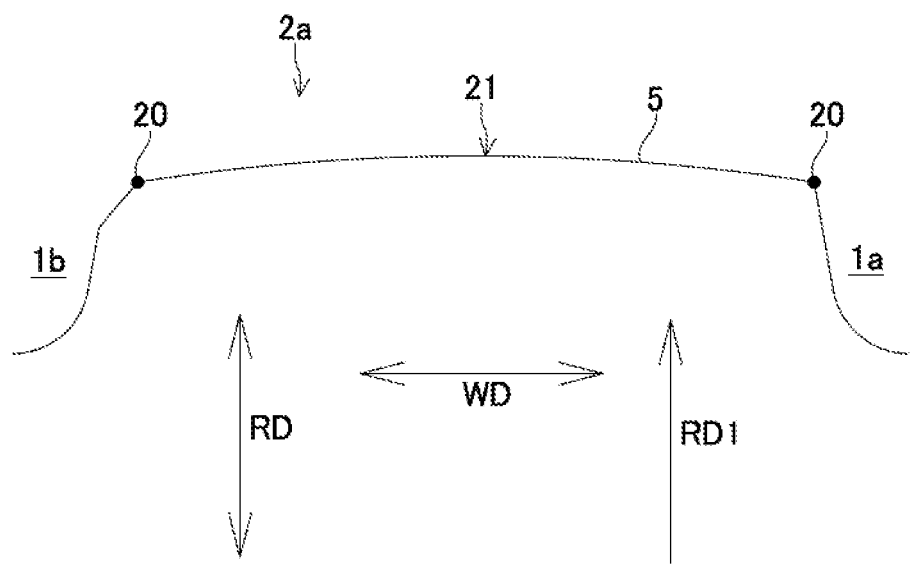
[FIG. 4A] Tire meridional section of lug

In accordance with the first embodiment, as shown in FIG. 4A, to reduce nonuniformity in contact patch pressure when on a dry road surface and to improve contact patch characteristics when on a dry road surface, lug 2a as viewed in a tire meridional section is such that central region 21 in the tire width direction protrudes toward the exterior RD1 in the tire radial direction relative to either end 20 in the tire width direction WD. The protruding shape thereof is formed from at least one curve having at least one radius of curvature. As used herein, central region 21 in the tire width direction of lug 2a refers to that region which is disposed toward the interior in the tire width direction WD from the two ends 20 in the tire width direction WD of lug 2a. The two ends 20 in the tire width direction WD of lug 2a refer to the ends thereof at contact patch surface 5. By thus causing central region 21 in the tire width direction of lug 2a to protrude beyond end(s) 20, it is possible to increase the tendency for central region 21 in the tire width direction to make contact with the ground as compared with end(s) 20 and increase contact patch pressure at central region 21 in the tire width direction when on a dry road surface, making it possible to achieve increased uniformity in contact patch pressure and improve performance with respect to stability in handling.

On the other hand, causing central region 21 in the tire width direction of lug 2a to protrude toward the exterior RD1 in the tire radial direction relative to end(s) 20 will decrease the tendency for end(s) 20 of lug 2a to make contact with the ground as compared with central region 21 in the tire width direction, which will disadvantage edge components at end(s) 20 as compared with central region 21 in the tire width direction. However, because the width of recessed region 3 is made to increase as one proceeds from the center of lug 2a to the end of lug 2a, this increases the effect of second edge 34 at end 20 of lug 2a, making it possible to ensure that there will be edge components thereat.

Figure 4B:
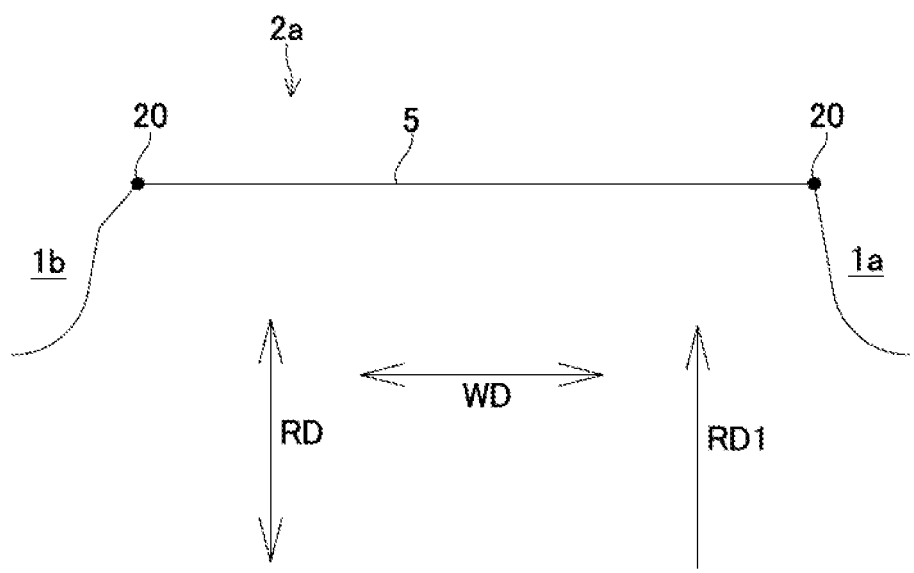
[FIG. 4B] Tire meridional section of a lug in accordance with a variation

Of course, as shown in FIG. 4B, where there is no intention to improve contact patch characteristics when on a dry road surface such as might be the case not with an all-season tire but with a studless tire, lug 2a as viewed in a tire meridional section need not be such that central region 21 in the tire width direction protrudes toward the exterior RD1 in the tire radial direction relative to either end 20 in the tire width direction WD, it being possible for the region between ends 20 in the tire width direction of lug 2a to be flat.

Variations

Whereas in the example shown in FIG. 1 and FIG. 2A the first end of sipe 4a opens into major groove 1 and the second end thereof terminates within the interior of lug 2a, there is no limitation with respect thereto. For example, both the first end and the second end of sipe 4 a may open into major groove 1. Furthermore, whereas in accordance with the first embodiment the direction in which sipe 4 extends is such that it is inclined with respect to both the tire width direction WD and the tire circumferential direction CD, there is no limitation with respect thereto. So long as it extends so as to be inclined with respect to the tire circumferential direction CD, the direction in which sipe 4 extends may coincide with the tire width direction WD.

Whereas in accordance with the first embodiment the first recessed regions 3a and the second recessed regions 3b are arranged in alternating fashion along the tire circumferential direction CD, there is no limitation with respect thereto. The first recessed regions 3a and the second recessed regions 3b need not be arranged in alternating fashion along the tire circumferential direction CD. Furthermore, whereas both first recessed regions 3a and second recessed regions 3b are arranged at lug 2a, there is no limitation with respect thereto. An example in which first recessed regions 3a are formed at the lug but second recessed regions 3b are not formed thereat may be cited as example. Similarly, an example in which second recessed regions 3b are formed at the lug but first recessed regions 3a are not formed thereat may be cited.

Moreover, whereas first recessed regions 3a and second recessed regions 3b are inclined in the same direction with respect to the tire width direction, there is no limitation with respect thereto. First recessed regions 3a and second recessed regions 3b may be inclined in mutually opposite directions.

Figure 5:
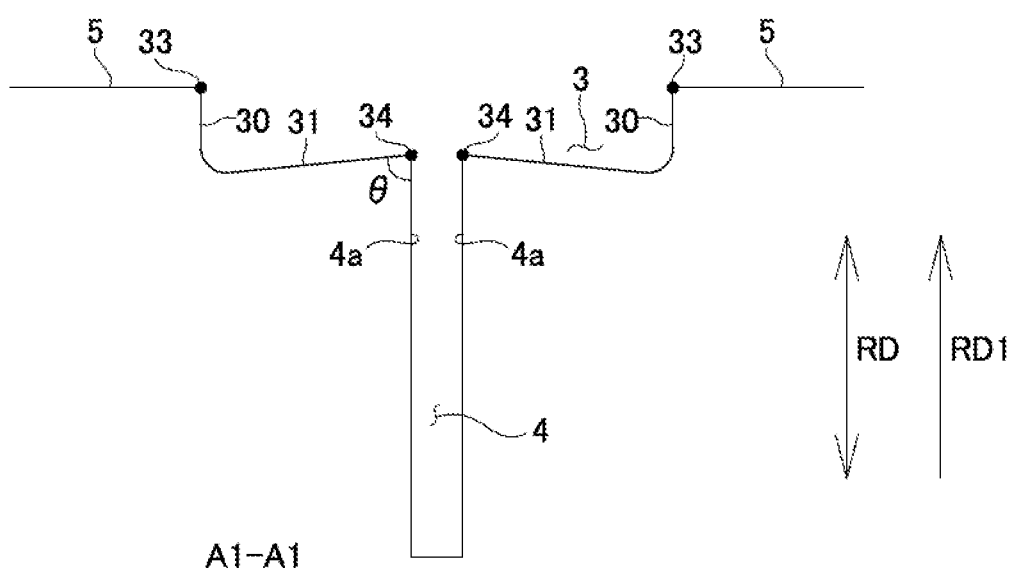
[FIG. 5] Sectional view taken along section A1-A1 in accordance with a variation

Furthermore, whereas, in accordance with the first embodiment, planar base 31 extends in the horizontal direction, there is no limitation with respect thereto. For example as shown in FIG. 5, planar base 31 may be inclined in such fashion that the height thereof increases so, as to be increasingly directed toward the exterior RD1 in the tire radial direction as one proceeds toward the center in the width direction of recessed region 3 as viewed in a section taken along the width direction of recessed region 3. Where this is the case, the angle between planar base 31 and opening sidewall 4a (the angle at second edge 34) will be less than 90°. By thus causing the angle at second edge 34 to be less than 90°, because this will increase the surface area of recessed region 3 (planar base 31), it will be possible to improve performance with respect to dissipation of heat.

Figure 6:
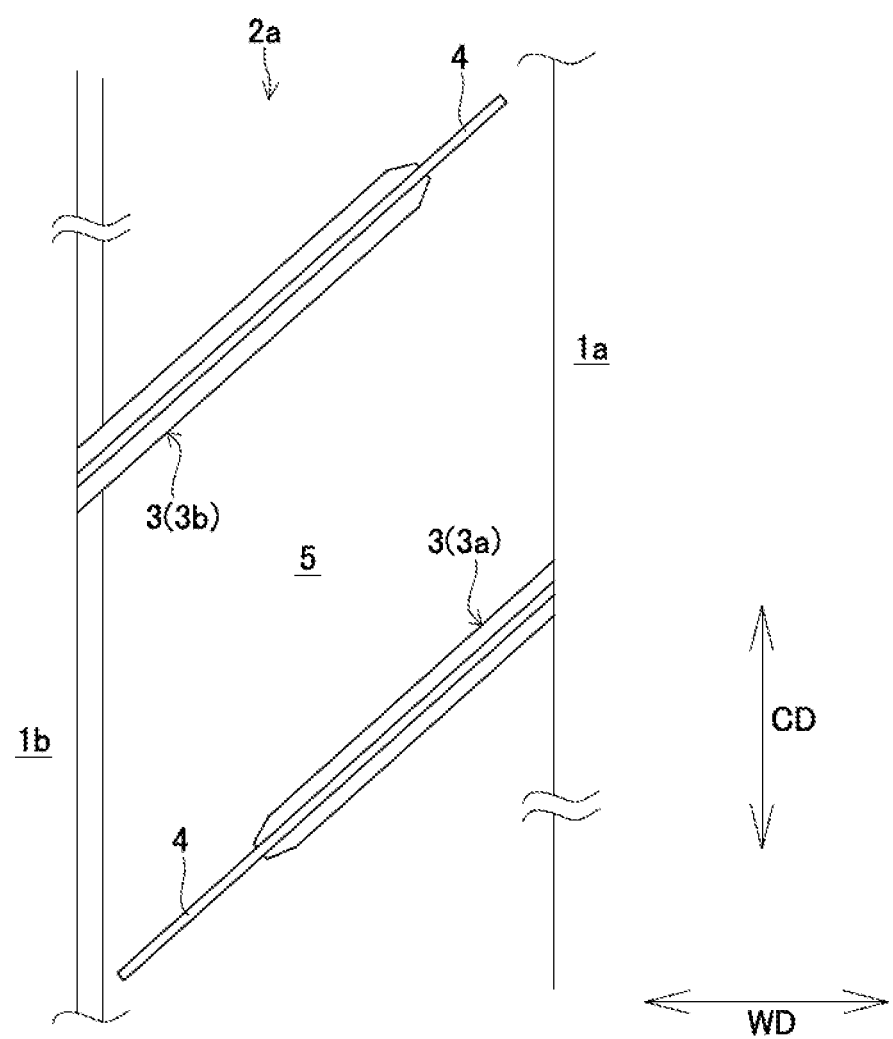
[FIG. 6] Plan view showing lug in which recessed regions and sipes are formed in accordance with a variation

Whereas in accordance with the first embodiment the width of recessed region 3 (the width of planar base 31) increases as one proceeds from the center of lug 2a to the end of lug 2a, there is no limitation with respect thereto. For example as shown in FIG. 6, width of recessed region 3 (width of planar base 31) may be constant.

Figure 7A:
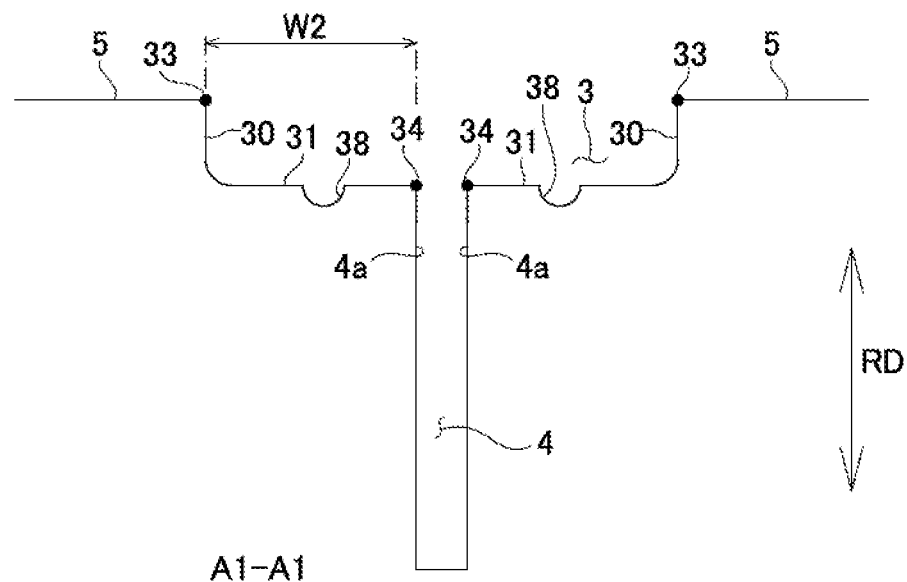
[FIG. 7A] Sectional view taken along section A1-A1 in accordance with a variation
Figure 7B:
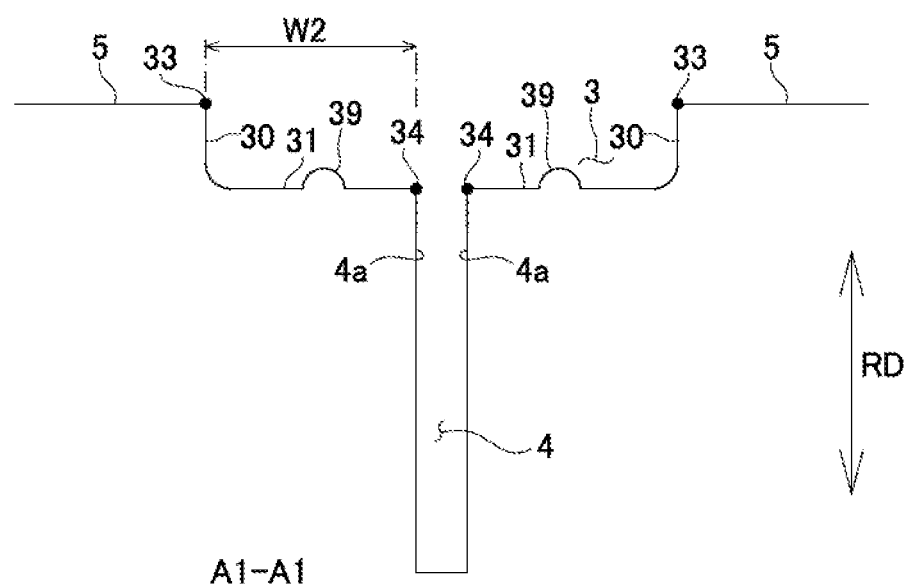
[FIG. 7B] Sectional view taken along section A1-A1 n accordance with a variation

Furthermore, whereas, in accordance with the first embodiment, planar base 31 is a flat surface, there is no limitation with respect thereto. For example as shown in FIG. 7A, one or more dimples 38 of width less than width W2 of planar base 31 may be formed at planar base 31. Or in another example as shown in FIG. 7B, one or more protrusions 39 of width less than width W2 of planar base 31 may be formed at planar base 31.

At the embodiment shown in FIG. 1, the lug(s) 2a to which the present disclosure may be applied are not limited to mediate lug(s) 2a. For example, the present disclosure may be applied to center lug(s) 2b, to other mediate lug(s) 2c, and/or to shoulder lug(s) 2d.

As described above, a pneumatic tire in accordance with the present embodiment comprises a lug 2a that is partitioned by at least one major groove (1a, 1b) and that forms a contact patch surface 5; a sipe 4 that extends from the at least one major groove 1a [1b] so as to be directed toward a center in a tire width direction of the lug 2a, the sipe 4 having an opening sidewall 4a extending in a vertical direction (RD); and a recessed region 3 that is formed to either side in a width direction of the sipe 4 and that is recessed relative to the contact patch surface 5. The recessed region 3 has a vertical face 30 that forms a first edge 33 between the vertical face 30 and the contact patch surface 5, and has a planar base 31 that intersects the opening sidewall 4a of the sipe 4. The planar base 31 and the opening sidewall 4a of the sipe 4 forming a second edge 34 at which the angle θ between the planar base 31 and the opening sidewall 4a is not greater than 90°. Difference in height in the vertical direction of the first edge and the second edge is greater than or equal to 0.5 mm but is less than or equal to 1.5 mm. Distances to the first edge and the second edge in the width direction of the sipe are not less than 1.5 mm.

Thus, recessed region 3 is formed to either side in the width direction of sipe 4 formed at lug 2a, recessed region 3 being formed from vertical face 30 and planar base 31. Because first edge 33 is formed between contact patch surface 5 and vertical face 30 that extends in parallel fashion with respect to the vertical direction which is parallel to the tire radial direction RD, an edge effect due to action by first edge 33 is exhibited. Furthermore, because second edge 34 is formed between planar base 31 and opening sidewall 4a of sipe 4, and because angle θ of second edge 34 is not greater than 90°, an edge effect due to action by second edge 34 is exhibited. Moreover, because difference D2 in the height in vertical direction RD of first edge 33 and second edge 34 is not greater than 1.5 mm, and because distances to first edge 33 and second edge 34 in the width direction of sipe 4 are not less than 1.5 mm, it will be the case that deformation by lug 2a when acted upon by a load will cause second edge 34 to be made capable of coming in contact with the ground, as a result of which it will be possible to obtain a doubling of edge effect due to action by first edge 33 and second edge 34, and it will be possible to improve performance with respect to traction in snow. Because difference D2 in the height in the vertical direction (RD) of first edge 33 and second edge 34 is not less than 0.5 mm, it will be possible to obtain an edge effect due to action by first edge 33.

Accordingly, because two edge effects will be exhibited per side in the width direction of sipe 4, and four edge effects will be exhibited at both sides in the width direction of sipe 4, it will be possible to improve performance with respect to traction in snow.

As is the case in the embodiment shown in FIG. 3A and FIG. 3B, it is preferred that standoff distance(s) W2 (W3) to first edge 33 and to second edge 34 in the width direction of sipe 4 be not greater than 3.0 mm.

If the foregoing standoff distance(s) W2 (W3) exceed 3.0 mm, the increased size of recessed region 3 will result in reduced rigidity at lug 2a, which will impair performance with respect to stability in handling when on a dry road surface. Accordingly, adoption of the foregoing constitution will make it possible to suppress and/or prevent impairment of performance with respect to stability in handling.

As is the case in the embodiment shown in FIG. 2A, FIG. 3A and FIG. 3B, it is preferred that standoff distances W2 (W3) to the first edge 33 and the second edge 34 in the width direction of the sipe 4 increase as one proceeds from a center of the lug 2a to an end of the lug 2a.

On a snowy road surface, there is ordinarily a tendency for the coefficient of friction μ to be low and for contact patch pressure to be low at end 20 in the tire width direction WD of lug 2a, and conversely for contact patch pressure to be high at central region 21 in the tire width direction of lug 2a. In accordance with the embodiment shown in FIG. 2A, FIG. 3A, and FIG. 3B, because the foregoing standoff distance(s) (width(s) of recessed region 3) increase as one proceeds from the center of lug 2a to the end of lug 2a, contact patch area at the end portion of lug 2a will be less than contact patch area toward the center, increasing contact patch pressure per unit area at the end portion of lug 2a and making it possible to achieve increased uniformity in contact patch pressure.

As is the case in the embodiment shown in FIG. 4A, it is preferred that the lug 2a as viewed in a tire meridional section is such that a central region 21 in the tire width direction protrudes toward an exterior in a tire radial direction (RD) relative to either end 20 in the tire width direction (WD). Furthermore, as is the case in FIG. 2A, it is preferred that standoff distances W2 (W3) to the first edge 33 and the second edge 34 in the width direction of the sipe 4 increase as one proceeds from a center of the lug 2a to an end of the lug 2a.

Thus, causing central region 21 in the tire width direction of lug 2a to protrude toward the exterior RD1 in the tire radial direction relative to end(s) 20 will decrease the tendency for end(s) 20 of lug 2a to make contact with the ground as compared with central region 21 in the tire width direction, which will disadvantage edge components at end(s) 20 as compared with central region 21 in the tire width direction. However, because the width of recessed region 3 is made to increase as one proceeds from the center of lug 2a to the end of lug 2a, this increases the effect of second edge 34 at end 20 of lug 2a, making it possible to ensure that there will be edge components thereat. Accordingly, it will be possible to simultaneously achieve improvement in both traction in snow as well as in performance with respect to stability in handling when on a dry road surface.

As is the case in the embodiment shown in FIG. 7A and FIG. 7B, it is preferred that one or more dimples 38 and/or protrusions 39 of width less than width W2 of the planar base 31 are formed at the planar base 31.

As a result of adoption of this constitution, because edge effects will be exhibited not only due to action by first edge 33 and second edge 34 but also due to action by dimples 38 and/or protrusions 39, it will be possible to further improve performance with respect to traction in snow.

Second Embodiment

Figure 8:
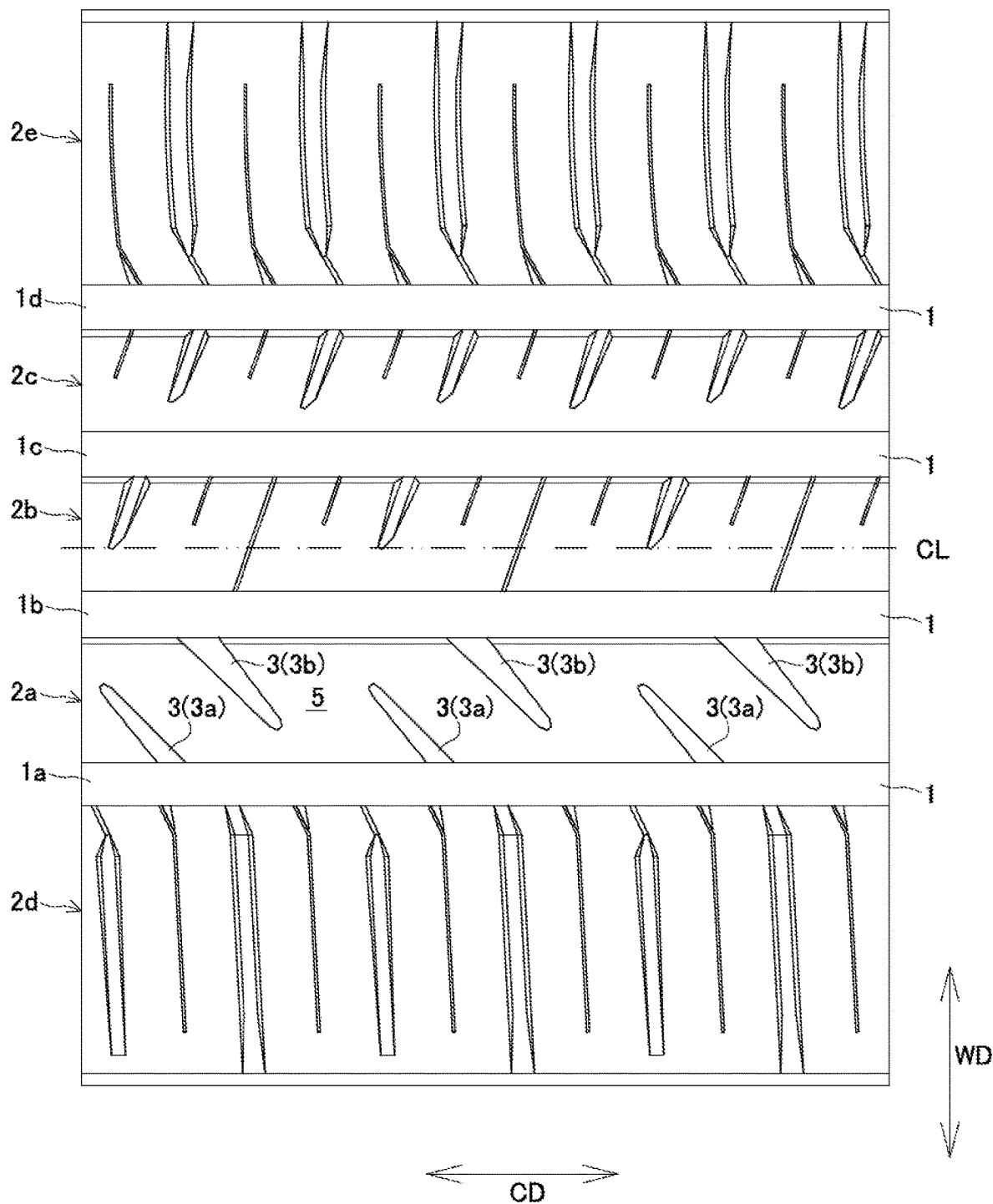
[FIG. 8] Plan view showing tread pattern in accordance with a second embodiment
Figure 9:
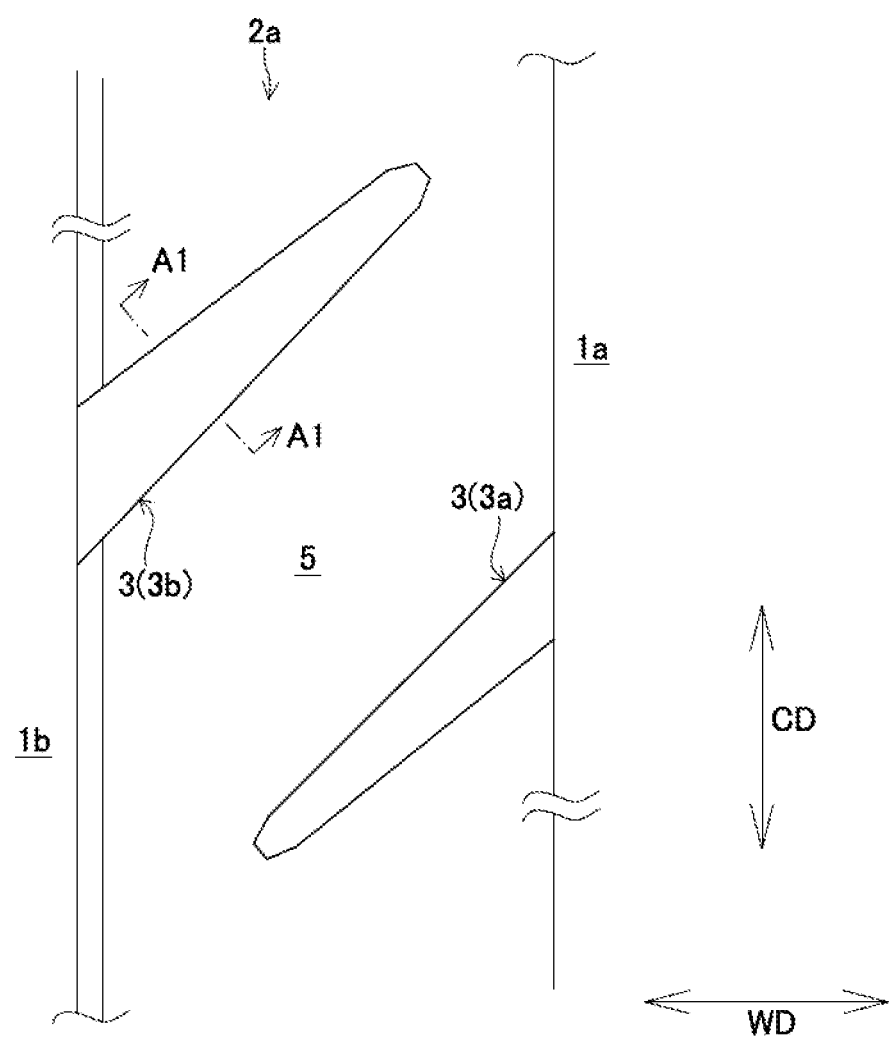
[FIG. 9] Plan view showing lug in which sipe and recessed region are formed in accordance with the second embodiment
Figure 10A:
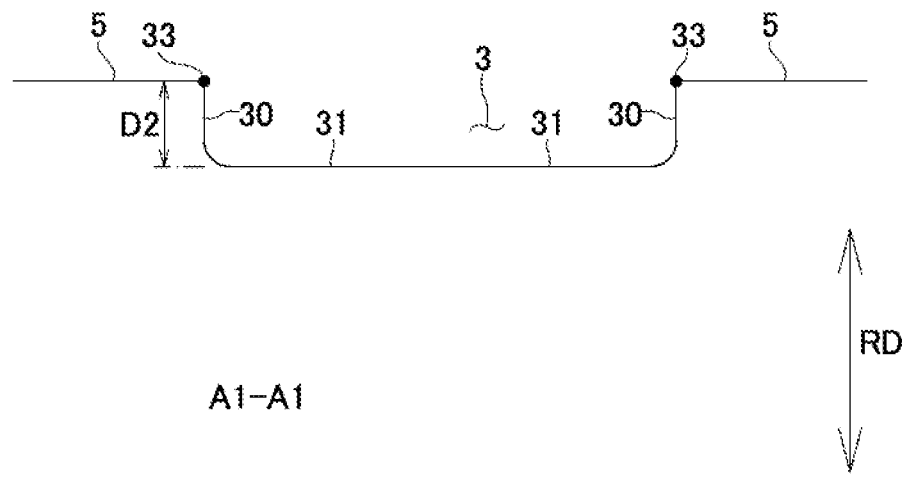
[FIG. 10A]Sectional view taken along section A1-A1 in FIG. 9
Figure 10B:
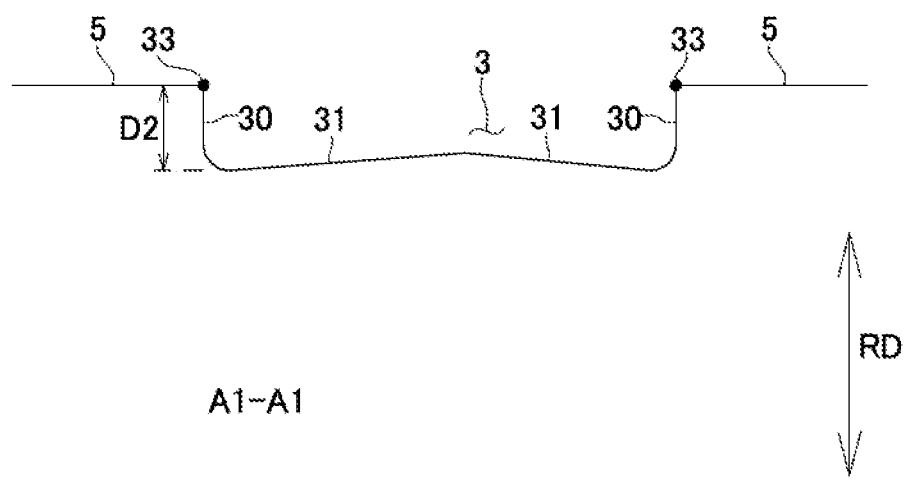
[FIG. 10B] Sectional view taken along section A1-A1 in accordance with a variation

As shown in FIG. 8, FIG. 9, and FIG. 10A, the second embodiment is an embodiment in which sipe 4 of the first embodiment is not provided. FIG. 8 shows the situation that exists when first recessed regions 3a and second recessed regions 3b are arranged in alternating fashion in the tire circumferential direction CD at lug 2a. FIG. 9 is an enlarged view showing a first recessed region 3a and a second recessed region 3b. FIG. 10A is a sectional view taken along section A1-A1 in FIG. 9. As shown in FIG. 10A, planar base 31 extends in the horizontal direction. In accordance with a variation as shown in FIG. 10B, planar base 31 may be inclined in such fashion that the height thereof increases so as to be increasingly directed toward the exterior RD1 in the tire radial direction as one proceeds toward the center in the width direction of recessed region 3 as viewed in a section taken along the width direction of recessed region 3.

As described above, a pneumatic tire in accordance with the first or second embodiment comprises a lug 2a that is partitioned by a first major groove 1a and a second major groove 1b, and that forms a contact patch surface 5; a plurality of first recessed regions 3a that extend from the first major groove 1a so as to be directed toward a center in a tire width direction of the lug 2a, that terminate within an interior of the lug 2a, and that are recessed relative to the contact patch surface 5; and a plurality of second recessed regions 3b that extend from the second major groove 1b so as to be directed toward the center in the tire width direction of the lug 2a, that terminate within the interior of the lug 2a, and that are recessed relative to the contact patch surface 5. The lug 2a is such that a central region thereof in the tire width direction protrudes relative to either end 20 thereof in the tire width direction WD. The plurality of first recessed regions 3a and the plurality of second recessed regions 3b are arranged in alternating fashion along a tire circumferential direction CD. The respective recessed regions 3 each has a vertical face 30 that descends in a vertical direction (RD) from the contact patch surface 5, and a planar base 31 that extends in a width direction of the each recessed region 3. The planar base 31 is horizontal, or is inclined in such fashion that a height thereof increases so as to extend further toward an exterior RD1 in a tire radial direction as one proceeds toward a center of the each recessed region 3 as viewed in a section taken along the width direction of the each recessed region 3, Width W2 (W3) of the planar base 31 increases as one proceeds from the center in the width direction of the lug 2a to an end of the lug 2a.

In accordance with this constitution, because lug 2a is such that central region 21 in the tire width direction protrudes toward the exterior RD1 in the tire radial direction relative to end(s) 20 in the tire width direction, there will be increased tendency for central region 21 in the tire width direction to make contact with the ground as compared with end(s) 20, increasing contact patch pressure at central region 21 in the tire width direction when on a dry road surface, this being in a direction such as will permit increase in uniformity in contact patch pressure, which will make it possible to improve performance with respect to stability in handling. And yet, if the amount by which this protrudes relative thereto is excessive, this will disturb the balance in contact patch pressure. In this regard, because the width of planar base 31 (recessed region 3) at the end of lug 2a is formed so as to be greater than the width of planar base 31 (recessed region 3) at a location toward the center of the lug, this will increase contact patch pressure at end(s) 20 in the tire width direction of lug 2a as compared with central region 21 in the tire width direction of lug 2a, making it possible to achieve balance contact patch pressure between the central portion and the end(s), as a result of which performance with respect to stability in handling when on a dry road surface will be improved.

Furthermore, because planar base 31 is horizontal, or is inclined in such fashion that the height thereof increases so as to extend further toward the exterior RD1 in the tire radial direction as one proceeds toward the center of recessed region 3 as viewed in a section taken along the width direction of recessed region 3, it will be possible to suppress occurrence of a situation in which excessive size of recessed region 3 causes reduced rigidity at lug 2a and impairment of performance with respect to stability in handling when on a dry road surface.

At the same time, because lug 2a is such that central region 21 in the tire width direction protrudes beyond the two ends 20 in the tire width direction, it will be possible improve performance with respect to water shedding.

As is the case in the embodiment shown in FIG. 3A and FIG. 3B, it is preferred that the tire further comprising a first edge 33 formed by the contact patch surface 5 and the vertical face 30, difference D2 in height in the vertical direction (RD) of the planar base 31 and the first edge 33 is greater than or equal to 0.5 mm but is less than or equal to 1.5 mm.

Within this numerical range, it will be possible to properly suppress occurrence of a situation in which excessive size of recessed region 3 causes reduced rigidity at lug 2a and impairment of performance with respect to stability in handling when on a dry road surface.

As is the case in the present embodiment, a sipe 4 is formed at the central region of the each recessed region 3.

In accordance with this constitution, edge effects are exhibited due to action by sipes 4, making it possible to improve performance with respect to traction. Moreover, sipes 4 facilitate conformability of lug 2a and the tendency for contact with the ground to occur, making it possible to improve performance with respect to traction and performance with respect to braking.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire comprising:
    a lug that is partitioned by a first major groove and a second major groove, and that forms a contact patch surface;
    a plurality of first recessed regions that extend from the first major groove so as to be directed toward a center in a tire width direction of the lug, that terminate within an interior of the lug, and that are recessed relative to the contact patch surface; and
    a plurality of second recessed regions that extend from the second major groove so as to be directed toward the center in the tire width direction of the lug, that terminate within the interior of the lug, and that are recessed relative to the contact patch surface;
    wherein the lug is such that a central region thereof in the tire width direction protrudes relative to either end thereof in the tire width direction;
    wherein the plurality of first recessed regions and the plurality of second recessed regions are arranged in alternating fashion along a tire circumferential direction such that the respective first recessed regions and the respective second recessed regions are disposed next to each other in the tire circumferential direction;
    wherein the respective recessed regions each has a vertical face that descends in a vertical direction from the contact patch surface, and a planar base that extends in a width direction of the each recessed region;
    wherein the planar base is inclined in such fashion that a height thereof increases so as to extend further toward an exterior in a tire radial direction as one proceeds toward a center of the each recessed region as viewed in a section taken along the width direction of the each recessed region; and
    wherein width of the planar base increases as one proceeds from the center in the width direction of the lug to an end of the lug,
    wherein a width of the respective recessed regions is not less than 3.3 mm,
    wherein the pneumatic tire further comprises a first edge formed by the contact patch surface and the vertical face, and
    wherein a difference in height in the vertical direction of the planar base and the first edge is greater than or equal to 0.5 mm but is less than or equal to 1.5 mm.

2. The pneumatic tire according to claim 1 wherein a sipe is formed at the central region of the each recessed region.

3. The pneumatic tire according to claim 1, wherein the width of the planar base at the end of the lug is the largest compared to other portion of the planar base.

4. The pneumatic tire according to claim 3, wherein the width of the planar base gradually increases as one proceeds from the center in the width direction of the lug to the end of the lug.

5. The pneumatic tire according to claim 2, wherein the sipe has a length longer than a length of corresponding one of the recessed regions.

6. A pneumatic tire comprising:
    a lug that is partitioned by a first major groove and a second major groove, and that forms a contact patch surface;
    a plurality of first recessed regions that extend from the first major groove so as to be directed toward a center in a tire width direction of the lug, that terminate within an interior of the lug, and that are recessed relative to the contact patch surface; and
    a plurality of second recessed regions that extend from the second major groove so as to be directed toward the center in the tire width direction of the lug, that terminate within the interior of the lug, and that are recessed relative to the contact patch surface;
    wherein the lug is such that a central region thereof in the tire width direction protrudes relative to either end thereof in the tire width direction;
    wherein the plurality of first recessed regions and the plurality of second recessed regions are arranged in alternating fashion along a tire circumferential direction such that the respective first recessed regions and the respective second recessed regions are disposed next to each other in the tire circumferential direction;
    wherein the respective recessed regions each has a vertical face that descends in a vertical direction from the contact patch surface, and a planar base that extends in a width direction of the each recessed region;
    wherein the planar base is inclined in such fashion that a height thereof increases so as to extend further toward an exterior in a tire radial direction as one proceeds toward a center of the each recessed region as viewed in a section taken along the width direction of the each recessed region; and
    wherein width of the planar base increases as one proceeds from the center in the width direction of the lug to an end of the lug,
    wherein a width of the respective recessed regions is not less than 3.3 mm,
    wherein a sipe is formed at the central region of the each recessed region,
    wherein the sipe has a length longer than a length of corresponding one of the recessed regions.

* * * * *